| United States Patent [19] | [11] Patent Number: 4,774,356 |
| Inoue et al. | [45] Date of Patent: * Sep. 27, 1988 |

[54] PROCESS FOR PREPARING POLYALKYLENE OXIDE HAVING UNSATURATED END GROUPS

[75] Inventors: Shohei Inoue; Takuzo Aida, both of Tokyo; Michihide Honma; Katsuhiko Isayama, both of Kobe, all of Japan

[73] Assignee: Kanegafuchi Chemical Industry Co., Ltd., Osaka, Japan

[ * ] Notice: The portion of the term of this patent subsequent to Mar. 31, 2004 has been disclaimed.

[21] Appl. No.: 843,389

[22] Filed: Mar. 24, 1986

[30] Foreign Application Priority Data

Mar. 22, 1985 [JP] Japan ................................ 60-58746

[51] Int. Cl.$^4$ ...................... C07C 69/52; C07C 43/11
[52] U.S. Cl. .................... 560/224; 568/607; 568/613; 568/616; 502/163; 560/221
[58] Field of Search ............... 560/224, 221; 568/607, 568/613, 616; 502/163

[56] References Cited

U.S. PATENT DOCUMENTS

| 3,042,725 | 7/1962 | Carter et al. | 568/616 |
| 3,951,888 | 4/1976 | Isayama et al. | 568/607 |
| 4,654,417 | 3/1987 | Inoue et al. | 528/416 |

OTHER PUBLICATIONS

Aida, Takuzo et al., *Makromol. Chem.*, vol. 182 (1981), pp. 1073–1079.
Kirk–Othmer, *Encyclopedia of Chemical Technology*, 2nd ed., vol. 8 (1966), pp. 269–280.

*Primary Examiner*—Paul J. Killos
*Attorney, Agent, or Firm*—Wegner & Bretschneider

[57] ABSTRACT

Polypropylene oxide having unsaturated end groups is prepared by polymerizing alkylene oxide in the presence of a complex catalyst prepared by reacting an organoaluminum compound with a porphyrin compound and an active hydrogen-containing compound and converting at least one hydroxyl end groups into an unsaturated end group(s), the prepared polymer having a narrow distribution of molecular weight.

6 Claims, No Drawings

PROCESS FOR PREPARING POLYALKYLENE OXIDE HAVING UNSATURATED END GROUPS

FIELD OF THE INVENTION

The present invention relates to a process for preparing polyalkylene oxide having unsaturated end groups.

BACKGROUND OF THE INVENTION

Polyalkylene oxide having unsaturated groups at chain ends is cured alone to be used as an elastomeric material, or blended with other polymer as a modifier to improve a cross linking property of other polymer. In addition, when the unsaturated group is converted to other more active group such as a silyl group having a hydrolyzable group, polyalkylene oxide can be used as a liquid telechelic polymer which is cured to give an elastomeric material (cf. U.S. Pat. No. 3,971,751).

A conventional method for introducing the unsaturated groups at both chain ends comprises reacting hydroxyl groups of polyalkylene oxide prepared by conventional anionic polymerization with an alkali metal hydroxide (e.g. potassium hydroxide and sodium hydroxide), sodium methoxide or metal sodium to form alkoxide end groups, and then reacting the alkoxide end groups with an active halogen-containing compound having an unsaturated group to produce polyalkylene oxide having unsaturated end groups (cf. U.S. Pat. No. 3,951,888). When propylene oxide as alkylene oxide is polymerized by a conventional anionic polymerization method utilizing potassium hydroxide as a catalyst, it is difficult to produce a polymer having a molecular weight of 3,000 or more and the polymer has a wider distribution of molecular weight, since growing chain ends proceed a chain transfer reaction with propylene oxide monomers.

When polyalkylene oxide is utilized as an elastomeric material, preferably, its molecular weight should controlled to obtain the polymer having desired tensile properties. For example, for the preparation of the elastomeric material having larger elongation, it is necessary to use polyalkylene oxide having a higher molecular weight. To produce polyalkylene oxide having good tensile properties, it is also important for the polymer to have narrow distribution of molecular weight.

It was proposed to react the hydroxyl end groups of two molecules of polyalkylene oxide to elongate the chain length so as to produce polyalkylene oxide having unsaturated end groups with a molecular weight not smaller than 3,000 (cf. U.S. Pat. No. 3,951,881). However, such procedures are troublesome since it is difficult to precisely control the molecular weight. Even by such procedures, it is difficult to produce the polymer having a narrow distribution of molecular weight.

The present inventors have already developed a process for preparing polyalkylene oxide having unsaturated groups at chain ends (cf. Japanese Patent Application Nos. 58745/1985 and 60221/1985). This process utilizes a living polymerization of alkylene oxide in the presence of a complex catalyst prepared by reacting an organoaluminum compound with a porphyrin compound (cf. Makromol. Chem., 182, 1073–1079 (1981)). An example of the porphyrin compound is represented by the formula:

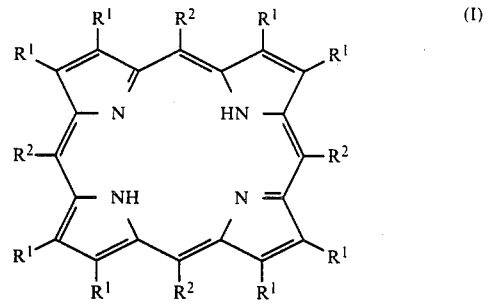

wherein $R^1$ is, the same or different, a hydrogen atom or a $C_1$–$C_4$ alkyl group; and $R^2$ is, the same or different, a hydrogen atom or a $C_1$–$C_{10}$ hydrocarbon group. An example of the complex catalyst is represented by the formula:

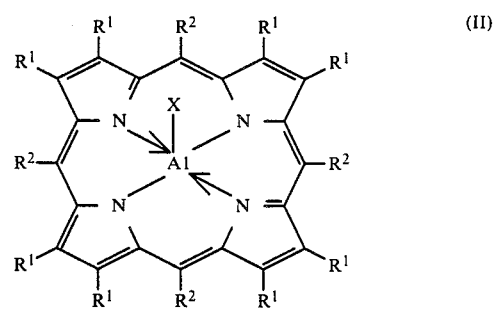

wherein $R^1$ and $R^2$ are the same as defined above, and X is a hydrogen atom, a halogen atom or a $C_1$–$C_4$ alkyl group.

The reaction scheme of this process may be as follows:

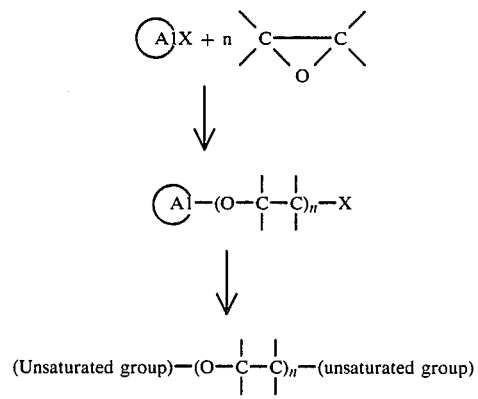

wherein

represents the complex (II), and n is an positive integer.

By this process, it is possible to freely control the molecular weight of polyalkylene oxide. Furthermore, polyalkylene oxide produced by this process has narrow distribution of molecular weight. However, polyalkylene oxide produced by this process is fairly expansive since only one mole of polyalkylene oxide is produced per mole of the expensive complex catalyst (II). Therefore, it is highly desired to produce less expensive polyalkylene oxide having an unsaturated end group(s), a high molecular weight and narrow distribution of molecular weight.

SUMMARY OF THE INVENTION

One object of the present invention is to provide a process for preparing polyalkylene oxide having an unsaturated end group(s).

Another object of the present invention is to provide a process for preparing polyalkylene oxide having an unsaturated end group(s) and a high molecular weight.

Further object of the present invention is to provide a process for preparing polyalkylene oxide having an unsaturated end group(s) and a narrow distribution of molecular weight.

Still another object of the present invention is to provide a process for preparing less expensive polyalkylene oxide having an unsaturated end group(s) and narrow distribution of molecular weight.

These and other objects are accomplished by a process according to the present invention, which comprises polymerizing alkylene oxide in the presence of a complex catalyst prepared by reacting an organoaluminum compound with a porphyrin compound and an active hydrogen-containing compound and converting a hydroxyl end group into an unsaturated end group.

DETAILED DESCRIPTION OF THE INVENTION

Specific examples of alkylene oxide to be polymerized by the process according to the present invention are aliphatic alkylene oxide having a three member ring epoxy terminal group (e.g. ethylene oxide, propylene oxide, 1-butylene oxide and epichlorohydrin) and aromatic alkylene oxide having a three member ring epoxy group (e.g. styrene oxide) and mixtures thereof. Among them, aliphatic alkylene oxide, particularly propylene oxide and a mixture of propylene oxide and ethylene oxide are preferable.

Specific examples of the organoaluminum compound to be reacted with the porphyrin compound are dialkylaluminum halide having 1 to 4 carbon atoms in each alkyl group (e.g. diethylaluminum chloride and diethylaluminum bromide), trialkylaluminum having 1 to 4 carbon atoms in each alkyl group (e.g. trimethylaluminum, triethylaluminum, tripropylaluminum and triisobutylaluminum) and alkylaluminum hydride having 1 to 4 carbon atoms in each alkyl group (e.g. diethylaluminum hydride and diisobutylaluminum hydride). Among them, dialkylaluminum halide and trialkylaluminum, particularly, diethylaluminum chloride and triethylaluminum are preferable.

The porphyrin compound to be used according to the present invention is represented by the above formula (I).

In the formula (I), the alkyl group may be a linear one or a branched one. The hydrocarbon group includes a linear or branched alkyl group, a cycloalkyl group, an aromatic group and an aralkyl group.

The porphyrin compound (I) includes tetramethyltetraethylporphyrin, octaethylporphyrin and tetraphenylporphyrin. Particularly, the porphyrin compound (I) wherein $R^1$ is a hydrogen atom and $R^2$ is a phenyl group, namely tetraphenylporphyrin is most preferable.

The aluminum porphyrin complex (II) is prepared by reacting the organoaluminum compound and the porphyrin compound (I). For example, the reaction is carried out in an atmosphere of inert gas such as nitrogen, helium and argon in the presence of a solvent. The organoaluminum compound and the porphyrin compound (I) are used in nearly equimolar amounts. Specific examples of the solvent are hydrocarbons (e.g. benzene, toluene and xylene), halogenated hydrocarbons (e.g. methylene chloride, chloroform and dichloroethane) and so on. When the organoaluminum compound is diethylaluminum chloride, X in the formula (II) may be a chlorine atom, and when the organoaluminum compound is triethylaluminum, X may be an ethyl group.

The complex (II) wherein X is a hydrogen atom or an alkyl group can be reacted with the active hydrogen-containing compound to give the complex (II) having a residue derived from the active hydrogen-containing compound. For example, (a) when the active hydrogen-containing compound is an organic compound having a hydroxyl group or water, there is obtained a complex (II) wherein X is an alkoxide group, a phenoxide group or a hydroxyl group, and (b) when the active hydrogen-containing compound is an organic compound having a carboxyl group, there is obtained a complex (II) wherein X is an acyloxy group.

The above described complex obtained by reacting the aluminum porphyrin complex (II) with the active hydrogen-containing compound may be used as a complex catalyst in the process according to the present invention.

According to the present invention, alkylene oxide is polymerized in the presence of the complex catalyst and also the active hydrogen-containing compound. The hydrogen-containing compound includes alcohols, phenols and carboxylic acids selected from the group consisting of (1) a compounds having an active hydrogen-containing group selected from a hydroxyl group and a carboxylic acid group, and an unsaturated end group, and (2) a polyhydric compound having, in total, at least 2, preferably 2 to 4 active hydrogen-containing groups selected from hydroxyl groups and carboxylic groups.

Specific examples of the compound of the group (1) are unsaturated alcohols (e.g. allyl alcohol, ethyleneglycol monoallyl ether, 3-butenyl alcohol, 2-hydroxyethyl acrylate and methacrylate and vinylbenzyl alcohol), unsaturated phenols (vinylphenol, allylphenol and allyloxyphenol) and unsaturated carboxylic acids (e.g. acrylic acid, vinylacetic acid, methacrylic acid and vinylbenzoic acid). Specific examples of the compound of the group (2) are polyhydric alcohols (e.g. ethylene glycol, triethylene glycol, tripropylene glycol, glycerol, trimethylolpropane and tetramethylolpropane), polyhydric phenols (e.g. resorcin, p-dihydroxybenzene, 2,4-toluenediol, 1,3,5-benzenetriol and 2,2'-bis(4-hydroxyhenyl)propane) and polyhydric carboxylic acids (e.g. adipic acid, sebacic acid, maleic acid, fumaric acid, 1,2,3-propane tricarboxylic acid, α-hydroxysuccinic acid, terephthalic acid and 1,2,4-benzene tricarboxylic acid). These compounds do not limit the scope of the invention, and in addition to these compounds, any other alcohols, phenols and carboxylic acids are preferably used according to the present invention. For the purpose of incorporating the unsaturated groups at the chain ends, the compounds of the group (1) are preferable. As described in the above, the complex (II) wherein X is an hydrogen atom or an alkyl group can react with the active hydrogen-containing compound. Thus, when such complex (II) is used as the catalyst, the hydrogen-containing compound should be used in such amount that the unreacted active hydrogen-containing compound still remains in the polymerization system.

According to the process of the invention, alkylene oxide is polymerized, for example, by the following reaction scheme:

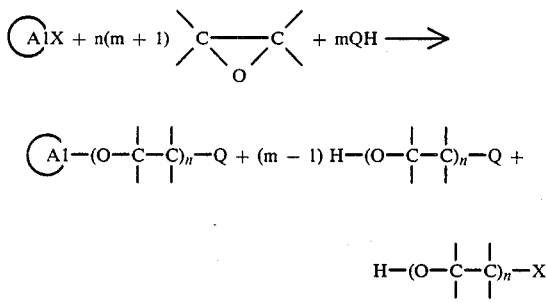

wherein

is the same as defined above, n and m are positive integers, and QH represents the active hydrogen-containing compound.

In the process of the invention, polyalkylene oxide is produced in an equimolar amount with the total amount of the complex catalyst and the active hydrogen-containing compound. Therefore, when the molar ratio of the total amount of the complex catalyst and the active hydrogen-containing compound to alkylene oxide is larger, polyalkylene oxide having a lower molecular weight is obtained, while when said ratio is smaller, polyalkylene oxide having a larger molecular weight is obtained.

The molar ratio of the complex catalyst to the active hydrogen-containing compound is usually 1:1 to 1:50. However, the molar ratio of 1:100 or less or even 1:500 may be used.

When the molar ratio of the complex catalyst to alkylene oxide to be polymerized is larger, the polymerization rate is higher. The amount of the complex catalyst is 0.001 to 10% by mole, preferably 0.01 to 1% by mole based on the amount of alkylene oxide. The amount of the active hydrogen-containing compound is 0.1 to 10% by mole, preferably 0.1 to 5% by mole based on the amount of alkylene oxide.

By the process of the present invention, more than one mole of polyalkylene oxide is produced per mole of the complex catalyst. Therefore, polyalkylene oxide of the present invention is economically produced.

Polymerization of alkylene oxide is carried out in the presence of the complex catalyst and the active hydrogen-containing compound in an atmosphere of an inert gas such as nitrogen in the presence or absence of a solvent.

Specific examples of the solvent used for the polymerization are hydrocarbons (e.g. benzene, toluene and xylene) and halogenated hydrocarbons (e.g. methylene chloride, chloroform and dichloroethane). The polymerization temperature is a room temperature or higher.

Polyalkylene oxide prepared by polymerizing alkylene oxide in the presence of the complex catalyst and the hydrogen-containing compound has hydroxyl groups at the chain ends, which are converted to the unsaturated end groups by various methods as follows:

(a) The hydroxyl group is reacted with an alkali or alkaline earth metal compound to form an alkoxide group, which is then reacted with an active halogen-containing compound having an unsaturated end group.

(b) When the polyalkylene oxide has the hydroxyl group at one chain end and the unsaturated group at the other end, the hydroxyl group is converted to the alkoxide group according to the method of the above (a) and then two molecules of the polymer are reacted with a compound having at least two active halogen atoms to link the polymers through said active halogen-containing compound.

(c) The hydroxyl group of the polymer is reacted with a unsaturated acid halide or a polyhydric acid halide in the presence of an amine.

(d) The polymer is subjected to transesterification with an unsaturated carbonate ester.

Specific examples of the alkali or alkaline earth metal compound are metal sodium, sodium hydroxide, potassium hydroxide, sodium methoxide and the like. Specific examples of the active halogen-containing unsaturated compound are allyl halides (e.g. allyl chloride and allyl bromide), unsaturated benzyl halides (e.g. vinylbenzyl chloride and allybenzyl chloride), unsaturated acid halides (e.g. acryloyl chloride, methacryloyl chloride, vinylbenzoyl chloride and allyl chloroformate) and the like. Specific examples of the compound having at least two active halogen atoms used in the methods (b) and (c) are poly(active halogen)-containing compounds (e.g. bis(chloromethyl)benzene, bis(bromomethyl)benzene, bischloromethyl ether and methylene bromide), polyhydric acid halides (e.g. adipic acid dichloride, terephthalic acid dichloride and phosgene) and the like.

In the method (a), at least equimolar amount of the active halogen-containing unsaturated compound is reacted with the alkoxide group. In the method (b), an equivalent amount of the poly(active halogen)-containing compound is reacted with the alkoxide group. Among the methods (a) to (d), the method (a) is preferable.

As understood from the above description, the unsaturated group present at the chain end of polyalkylene oxide is derived from the active hydrogen-containing unsaturated compound present in the polymerization system or formed by the conversion of the hydroxyl end group to the unsaturated group after polymerization. These two manners for introducing the unsaturated group at the chain end may be combined according to one of the preferred embodiments of the invention.

(i) Alkylene oxide is polymerized in the presence of the complex catalyst and the active hydrogen-containing unsaturated compound, and the hydroxyl group at one end of the resulting polymer is reacted with the alkali or alkaline earth metal compound to form the alkoxide group which is then reacted with the active halogen-containing unsaturated compound.

(ii) Polyalkylene oxide is prepared and the hydroxyl group is converted to the alkoxide group in the same manner as in (i), and then the alkoxide group is reacted with the poly(active halogen)-containing compound.

(iii) Polyalkylene oxide is prepared in the same manner as in (i), and then the hydroxyl group end of the polymer is reacted with the unsaturated acid halide in the presence of the amine.

(iv) Polyalkylene oxide is prepared in the same manner as in (i), and then reacted with the unsaturated carbonate ester to proceed transesterification.

(v) Alkylene oxide is polymerized in the presence of the complex catalyst and the poly(active hydrogen)-containing compound, and then all the hydroxyl end groups are reacted with the active halogen-containing unsaturated compound.

(vi) The polymer is prepared in the same manner as in (v), and then the hydroxyl group is reacted with the unsaturated acid halide.

(vii) The polymer is prepared in the same manner as in (v), and then the hydroxyl group is reacted with the unsaturated carbonate ester to proceed transesterification.

Among the above combinations, the combinations (i) and (v) are preferable since they can produce polyalkylene oxide having a larger amount of the unsaturated groups.

Polyalkylene oxide prepared by the process of the invention has a narrow distribution of molecular weight (Mw/Mn) of 1.5 or less, particularly 1.3 or less. The polymer may be a homopolymer of a single kind of alkylene oxide or a random or block copolymer of two or more kind of alkylene oxide. According to the present invention, liquid polyalkylene oxide having unsaturated end groups and a molecular weight of 500 to 20,000 is advantageously prepared.

Polyalkylene oxide prepared by the method of the invention is cured by radiation of electron beam or UV light and used as an additive, a coating and a rubber material. It can be blended with other polymer to improve cross linking property of the polymer. Further, the unsaturated end group may be converted to other more active group to give a telechelic liquid rubber. The cured rubber material of the polymer of the invention has excellent tensile properties because of the narrow distribution of molecular weight.

According to the present invention, polyalkylene oxide having unsaturated end groups is prepared in a simple manner and has a narrow distribution of molecular weight. The polymerization of alkylene oxide is carried out in the presence of a smaller amount of the catalyst so that the polymer is economically prepared.

The present invention will be explained further in detail by following examples.

REFERENCE EXAMPLE

Preparation of complex (II)

In methylene chloride (20 ml), diethylaluminum chloride (0.15 ml) and α,β,γ,δ-tetraphenylporphyrin (0.61 g) were reacted in a nitrogen atmosphere at a room temperature for 2 hours. Then, the reaction mixture was heated under reduced pressure to remove the volatile components to obtain a complex (hereinafter referred to as "Catalyst A"). Catalyst A may have the formula (II) wherein $R^1$ is a hydrogen atom, $R^2$ is a phenyl group and X is a chlorine atom.

EXAMPLE 1

In a egg plant-type glass flask filled with nitrogen, Catalyst A (0.11 g) was charged. In a nitrogen atmosphere, propylene oxide and allyl alcohol were added in amounts as shown in Table and reacted with stirring at a room temperature for 2 hours. After polymerization, unreacted propylene oxide was removed under reduced pressure to obtain polypropylene oxide. Then, acryloyl chloride and pyridine were added in amounts shown in Table and reacted at a room temperature for 8 hours. The reaction mixture was dissolved in hexane and washed with water. The hexane layer was dried over magnesium sulfate and filtered. The filtrate was distilled under reduced pressure to remove hexane to obtain a polymer. A molecular weight and its distribution were determined by GPC. The results are also shown in Table. GPC analysis was performed at an oven temperature of 40° C. by the use of a column filled with polystyrene gel (manufactured by Toyo Soda Co. Ltd., Japan) and tetrahydrofuran as an eluent.

The characterization of the end group of the polymer was carried out by IR and $^{13}$C-NMR analyses. It is known that polypropylene oxide polymerized in the presence of an aluminum porphyrin complex has end groups of the formula:

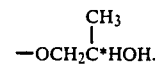

In the $C^{13}$-NMR analysis, resonance absorption due to the carbon atom C* having a hydroxyl group appears around δ=66.5 ppm. However, the polypropylene oxide prepared in Example 1 did not have any resonance absorption around 66.5 ppm.

In general, the hydroxyl group has characteristic absorption around 3,500 cm$^{-1}$ in the IR analysis. However, the polypropylene oxide prepared in Example 1 did not have such characteristic absorption. Form these results, it can be concluded that the polymer prepared in Example 1 had few hydroxyl end group.

In the $^{13}$C-NMR analysis of the polymer prepared in Example 1, resonance absorptions corresponding to carbon atoms (a), (b) and (c) of the group of the following formula appeared around 116 ppm, 134 ppm and 69 ppm, respectively:

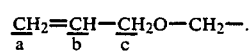

In addition, resonance absorptions corresponding to carbon atoms (d), (e) and (f) of the group of the following formula appeared around 130 ppm, 128 ppm and 167 ppm, respectively:

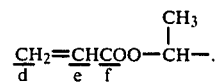

Integrated intensities of these two groups are substantially the same. Resonance absorption due to the methyl group in the polymer chain of polypropylene oxide appeared around 17.3 ppm in $^{13}$C-NMR. From the ratio of the integrated intensities of the absorptions due to the methyl group and due to the allyloxy group, an estimated molecular weight was calculated on the assumption that the allyloxy group was present at one end of the polymer chain. Similarly, an estimated molecular weight was calculated on the assumption that acryloyloxy group was present at one end of the polymer chain. Both estimated molecular weights well coincided with each other and also with the number average molecular weight obtained from GPC. From these results, it was concluded that polypropylene oxide prepared in Example 1 had the allyloxy group at one chain end and the acryloyloxy group at the other chain end and the following formula:

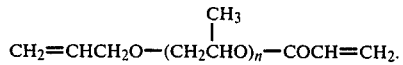

EXAMPLE 2

In the same manner as in Example 1 but using 2,2'-bis(4-hydroxylphenyl)propane in place of allyl alcohol and carrying the polymerization under conditions shown in Table, polypropylene oxide was prepared.

After polymerization, unreacted propylene oxide was removed, and a solution of sodium methoxide in methanol was added to the mixture containing the resulting polymer. After removing methanol at 70° C. under reduced pressure, allyl bromide was added and reacted at 30° C. for 8 hours. Thereafter, the polymer was recovered and purified in the same manner as in Example 1. The molecular weight and its distribution of the polymer were determined by GPC and characterization of the end groups was carried out by IR and $^{13}$C-NMR in the same manner as in Example 1. The results are shown in Table.

The estimated molecular weight on the assumption that the allyloxy groups were present at both chain ends well coincided with the number average molecular weight obtained from GPC. Thus, it was concluded that polypropylene oxide prepared in Example 2 had the allyloxy groups at both chain ends and the following formula:

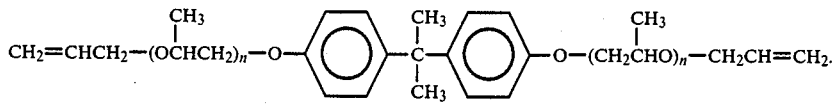

EXAMPLE 3

Propylene oxide was polymerized in the same manner as in Example 2 but employing the reaction conditions shown in Table, and then reacted with acryloyl chloride in the same manner as in Example 1. The resulting polymer was analyzed in the same manner as in Example 1 to find that it had the following formula:

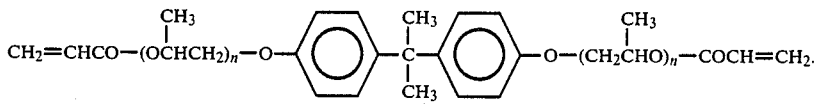

EXAMPLE 4

In the same manner as in Example 1 but using vinylphenol in place of ally alcohol and carrying out the reaction under conditions shown in Table, propylene oxide was polymerized. Then, the resulting polymer was reacted with acryloyl chloride to obtain desired polypropylene oxide.

In IR spectrum, any absorption characteristic to the hydroxyl group was not observed, and in $^{13}$C-NMR, any resonance absorption due to a carbon atom to which the hydroxyl group was bonded was not observed. On the contrary, resonance absorption due to the acryloyloxy group was observed. In addition, resonance absorptions corresponding to carbon atoms (g) and (h) of the group of the following formula appeared around 110 ppm and 135 ppm, respectively:

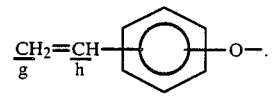

Thus, it was concluded that polypropylene oxide prepared in Example 4 had the acryloyloxy group at one chain end and the vinylphenoxy group at the other chain end and the following formula:

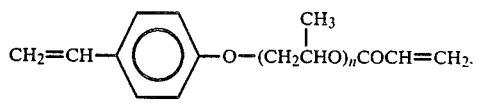

EXAMPLE 5

Propylene oxide was polymerized in the same manner as in Example 1 but employing the reaction conditions shown in Table, and then reacted with allyl bromide in the same manner as in Example 2. In IR spectrum, any absorption characteristic to the hydroxyl group was not observed. Thus, it could be concluded that the resulting polymer had substantially no hydroxyl group at the chain end.

In $^1$H-NMR of the polymer, resonance absorptions corresponding to the protons (a), (b) and (c) of the group of the following formula appeared at 5.0–5.3 ppm, 5.7–5.9 ppm and 3.9–4.1 ppm, respectively:

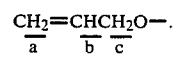

From the integrated absorption intensity due to the allyloxy group and that due to the methyl group and on the assumption that the allyloxy groups were present at both chain ends, an estimated molecular weight was calculated, which well coincided with the number average molecular weight obtained from GPC. Thus, it was concluded that polypropylene oxide prepared in Example 5 had the allyloxy groups at both chain ends and the following formula:

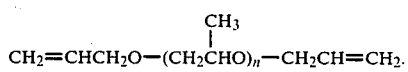

group with a molecule having a reactive halogen in addition to an unsaturated group.

2. The process according to claim 1, wherein the porphyrin compound is tetraphenylporphyrin.

3. The process according to claim 1, wherein alkylene oxide is propylene oxide.

4. A process for preparing polyalkylene oxide having at least one unsaturated end group and a distribution of molecular weight (Mw/Mn) of less than 1.3 which comprises the step of polymerizing alkylene oxide in the presence of (a) a complex catalyst prepared by reacting an organoaluminum compound with a porphyrin compound and (b) an organic compound having an unsaturated end group selected from a hydroxyl group and a carboxylic group.

5. The process according to claim 4, wherein the porphyrin compound is tetraphenylporphyrin.

6. The process according to claim 4, wherein alkylene oxide is propylene oxide.

TABLE

| Example No. | Reaction conditions | | | Yield (%) | Compound for introducing unsaturated end group(s) | Analysis of prepared polymer | | Estimated molecular weight |
|---|---|---|---|---|---|---|---|---|
| | Amount of Catalyst A (g) | Propylene oxide (g) | Active hydrogen-containing compound (g) | | | Mn | Mw/Mn | |
| 1 | 0.11 | 3.99 | Allyl alcohol (0.26) | 100 | Acryloyl chloride (2.0) Pyridine (2.0) | 1,020 | 1.15 | 1,040*(2) 1,110*(3) |
| 2 | 0.12 | 4.23 | 2,2'-Bis(4-hydroxyphenyl)-propane (1.01) | 100 | Allyl bromide (5) CH₃ONa*(1) (38) | 1,190 | 1.11 | 1,310 |
| 3 | 0.13 | 4.85 | ↑ (1.15) | 100 | Acryloyl chloride (3.0) Pyridine (3.0) | 1,280 | 1.08 | 1,380 |
| 4 | 0.083 | 3.47 | Vinylphenol (0.41) | 100 | Acryloyl chloride (2.0) Pyridine (2.0) | 1,270 | 1.10 | — |
| 5 | 0.13 | 5.7 | Allyl alcohol (0.29) | 100 | Allyl bromide (2.5) CH₃ONa*(1) (20) | 1,140 | 1.09 | 1.050 |

Note
*(1)10% Methanol solution.
*(2)Estimated molecular weight on the assumption that the allyloxy group was introduced at one chain end.
*(3)Estimated molecular weight on the assumption that the acryloyloxy group was introduced at one chain end.

What is claimed is:

1. A process for preparing polyalkylene oxide having at least one unsaturated end group and a distribution of molecular weight (Mw/Mn) of less than 1.3 which comprises the steps of (1) polymerizing alkylene oxide to obtain a polyalkylene oxide having at least one hydroxyl group in the presence of (a) a complex catalyst prepared by reacting an organoaluminum compound with a porphyrin compound and (b) an organic compound having at least two active hydrogen-containing groups selected from a hydroxyl group and a carboxylic group and (2) adding at least one unsaturated end group to the polymer chain by the reaction of the hydroxyl